May 17, 1938. W. ECHTERNACH 2,117,876
PROCESS OF MAKING A DIETICIAN'S IMPLEMENT
Filed Sept. 25, 1936

WITNESS:

INVENTOR
Wilhelmina Echternach
BY
ATTORNEY.

Patented May 17, 1938

2,117,876

UNITED STATES PATENT OFFICE 2,117,876

PROCESS OF MAKING A DIETICIAN'S IMPLEMENT

Wilhelmina Echternach, Philadelphia, Pa.

Application September 25, 1936, Serial No. 102,461

2 Claims. (Cl. 76—105)

In preparing foods, particularly for invalids, such as fruit juices, soups, purees, and the like, it is frequently found necessary to remove solid particles such as fruit seeds, fruit pulp, bones, or the like.

It is one object of my invention to provide an improved instrument for the above purpose comprising a long handle, a blade or bowl member, and a mesh or perforated portion within the circumference of the blade or bowl member.

Another object of my invention is to provide an improved process for the manufacture of such implements. This process comprises stamping or otherwise forming blanks whose outline is of the shape of the implement and which have adjacent one end a large opening therein, stamping or cutting the mesh or perforate material such as wire netting of the same shape in outline but slightly larger than the openings in the blank, assembling two of the blanks with a cut piece of perforate material between them and overlying the holes in the blank, compressing the blanks and the perforate material to shape the implement, and attaching the two blanks together by crimping or welding.

For a further exposition of my invention reference may be had to the annexed drawing and specification at the end whereof the novel features of my invention will be particularly pointed out and claimed.

In the drawing the Figure 1 is a perspective view of an implement.

Figures 1, 2, 3:
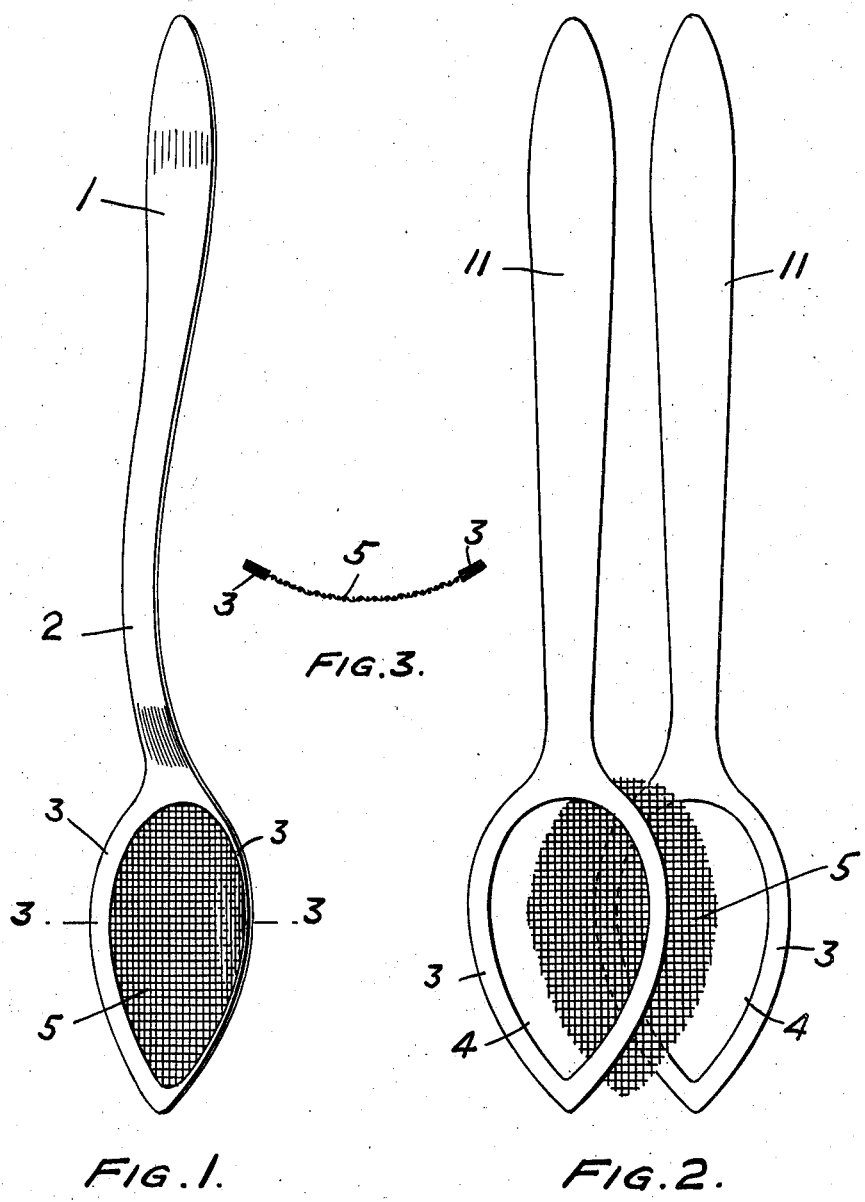
Fig. 2 is an exposed view showing the blanks and the cut piece of perforate material ready for shaping by compression into an implement.
Fig. 3 is a cross section on a larger scale on line 3—3 of Fig. 1.

In that embodiment of my invention selected from among others for illustration in the drawing and description of the specification my device is shown as an implement consisting of a handle 1 which is preferably elongated and arched in transverse cross section. Handle 1 has its intermediate portion drawn into an arch or bridge 2 as seen from the side. At one end the implement has a blade or bowl portion 3 having an arm or orifice 4 therein, see Fig. 2. In opening or orifice 4 is located a piece 5 of perforate material such as wire mesh or screening. I have found that a convenient size is screening of 22 meshes to the inch.

In Fig. 2 is illustrated a convenient process for the manufacture of the implement. This process consists in forming a plurality of duplicate flat blanks 11 as by stamping or similar operation. Each of the blanks 11 has an orifice 4 adjacent to one end thereof. There is next formed a portion 5 of perforate material of the same shape in outline as the openings 4 but slightly larger size. Two blanks 11 are next piled upon each other with a part 5 between them and overlying their openings 4. The blanks and the part 5 are then compressed to bend the blanks and the part in both transverse and vertical directions so as to form the implement. This compression step may compress the edges of the blanks together by crimping. However, I prefer to attach the two blanks together by a heat process such as by welding them particularly along the edges. The implement so formed may be given a coat of another metal either by electro-plating or by immersion process. The implement thus coated may be polished if desired.

The implement is found in use to be an exceedingly convenient means for removing solid particles such as fruit seeds or particles of bone from foods such as fruit juices and soups which must be prepared in large quantities in such places as hospitals.

I do not intend to be limited save as the scope of the prior art and the attached claims may require.

I claim:

1. A process of manufacturing a dietician's implement, which process comprises, forming flat blanks of the outline of the finished implement and having axially elongated orifices therein adjacent one end thereof, forming a portion of perforate material of the same shape in outline as said orifices but slightly larger, piling two of said blanks upon each other with one of said portions of mesh material between them and covering said orifices, bending said blanks and said mesh material in transverse and longitudinal directions to the shape of the finished implement and attaching said blanks and said mesh material together.

2. A process of manufacturing a dietician's implement, which process comprises, forming flat blanks of the outline of the finished implement and having axially elongated orifices therein adjacent one end thereof, forming a portion of perforate material of the same shape in outline as said orifices but slightly larger, piling two of said blanks upon each other with one of said portions of mesh material between them and covering said orifices, bending said blanks and said mesh material in transverse and longitudinal directions to the shape of the finished implement, and welding said blanks to each other and to said mesh material along the edges of said blanks.

WILHELMINA ECHTERNACH.